(12) United States Patent
Moy et al.

(10) Patent No.: US 7,473,725 B2
(45) Date of Patent: Jan. 6, 2009

(54) VINYL CHLORIDE POLYMER/NEOPENTYL GLYCOL BIS(DIPHENYL PHOSPHATE) COMPOSITIONS

(75) Inventors: Paul Y. Moy, Fishkill, NY (US); Lambertus Antonius De Kleine, Hengelo (NL)

(73) Assignee: Supresta LLC., Ardsley, NY (US)

( * ) Notice: Subject to any disclaimer, the term of this patent is extended or adjusted under 35 U.S.C. 154(b) by 569 days.

(21) Appl. No.: 10/518,876

(22) PCT Filed: Jun. 24, 2003

(86) PCT No.: PCT/US03/20012

§ 371 (c)(1), (2), (4) Date: Sep. 8, 2005

(87) PCT Pub. No.: WO04/000925

PCT Pub. Date: Dec. 31, 2003

(65) Prior Publication Data

US 2006/0111486 A1    May 25, 2006

(51) Int. Cl.
*C08K 5/50* (2006.01)

(52) U.S. Cl. ..................................... 524/121

(58) Field of Classification Search ............... 524/121
See application file for complete search history.

(56) References Cited

U.S. PATENT DOCUMENTS

| | | |
|---|---|---|
| 3,976,616 A | 8/1976 | Combey et al. |
| 4,032,498 A | 6/1977 | Dany et al. |
| 4,246,158 A | 1/1981 | Popp et al. |
| 4,343,732 A | 8/1982 | Zama et al. |
| 5,547,614 A | 8/1996 | Fesman et al. |
| 5,958,993 A | 9/1999 | Blundell et al. |

FOREIGN PATENT DOCUMENTS

WO    96/11996    4/1996

OTHER PUBLICATIONS

Miyachi, Yasuyoshi et al., "Development Of New Flame Retardants With Smoke Suppression Effect", Database Accession No. 129:246064, XP002253919, & Materiaru Raifu (1998), 10(3), pp. 137-142.

Hata, Naoaki et al. "Fire-Resistant Vinyl Halide Resin Compositions", Database Accession No. 81:136919, XP002253920 & JP 49 040342, Apr. 15, 1974.

*Primary Examiner*—Kamal A Saeed
(74) *Attorney, Agent, or Firm*—Dilworth & Barrese LLP.

(57) ABSTRACT

A vinyl chloride resin composition contains, as the major plasticizer, a neopentyl glycol bis(diphenyl phosphate) composition in an amount that is no less than about 25% by weight, based upon the vinyl chloride resin being present at 100%, by weight.

13 Claims, No Drawings

VINYL CHLORIDE POLYMER/NEOPENTYL GLYCOL BIS(DIPHENYL PHOSPHATE) COMPOSITIONS

Triaryl phosphate esters (for example, tricresyl phosphate) are recognized as one of the earliest primary commercial plasticizers for flexible vinyl chloride resins (hereinafter also referred to as "PVC"). These plasticizers are still used in vinyl composites to aid in conferring flexibility upon such compositions, but their main contribution is in regard to flame retardancy. Careful selection of the appropriate phosphate esters is critical for affecting the desired degree of flame retardancy. Trialkyl phosphates are too volatile for most vinyl applications. Triaryl phosphates are excellent flame retardant plasticizers but may generate too much smoke to pass current building codes and standards (namely, ASTM-E-84, the Steiner Tunnel test). Alkyl diphenyl phosphates, although slightly less effective as flame retardants, have, because of their alkyl side chain, the characteristic of producing less smoke in vinyl formulations since they have a lowers phenolic moiety content, which is well known for generating smoke. In fact, there is sufficient proof that slightly increasing the aliphatic chain length contributes to lower smoke generation.

Often, the effort to improve flame resistance is counterproductive to low smoke generation characteristics since these two phenomena can be the result of competing mechanisms. Flame retardants can interfere with the efficacy of the combustion of volatile species and can cause sooty air-borne particles to be formed, while low smoking composites can create higher heats of combustion to more efficiency consume combustible organic gases.

Certain disclosures that are relevant to the present invention exist in the prior art concerning blending a vinyl chloride resin with branched alkylene glycol bis(diphenyl phosphate) compositions. For example, British Patent No. 2,061,949 describes the addition of such bisphosphates at amounts of up to 10 parts by weight of bisphosphate per 100 parts by weight of vinyl chloride resin. Somewhat higher amounts of such bisphosphates (namely, up to about 20 wt % per 100 parts by weight of vinyl resin) are shown in Japanese Patent Publication No. 40342/74, but only in the presence of significantly higher amounts (30 wt % to 50 Wt %) of another, more conventional plasticizer (e.g., dioctyl phthalate). Finally, while U.S. Pat. No. 3,869,526 to M. Combey et al. also described the use of these bisphosphates, it specifically excludes those that contain aryl substitution of six to eight carbon atoms on all four —OR substituents attached to the two phosphorus atoms. This excludes, for example, neopentyl glycol bis(diphenyl phosphate) compositions from selection for use in the Combey invention.

The present invention relates to the use of a neopentyl glycol bis(diphenyl phosphate) composition, as the major plasticizing additive, to function as a very effective flame retardant in PVC composites, when used in amounts that are no less that about 25 wt %, by weight of the PVC (for example, from about 35 wt % to about 125 wt %, as exemplified by use at from about 40 wt % to about 90 wt % by weight of the PVC) while also contributing significantly less smoke than does a representative triaryl monophosphate ester. The flexibility of the resulting composition that is imparted to vinyl compounds by use of the present invention is similar to that obtained by use of a triaryl phosphate plasticizer. While other plasticizing additives can be also present in the composition, they will be present in lower amount than the amount of neopentyl glycol bis(diphenyl phosphate) composition.

EXAMPLES

Vinyl Formulations

| | Components | | | |
|---|---|---|---|---|
| | 1 | 2 | 3 | 4 |
| S-PVC (K = 71) | 100 | 100 | 100 | 100 |
| INTERLITE ZG6067/3 | 5 | 5 | 5 | 5 |
| ESTABEX E2307 | 2 | 2 | 2 | 2 |
| PHOSFLEX 390 | 60 | | | |
| NPGDP | | 60 | 60 | 60 |
| Zinc Borate | | | 6 | 6 |
| AOM LS030 | | | | 6 |

The vinyl resin used was a suspension type PVC with a K value of 71. The INTERLITE brand stabilizer (from Akcros) was a mixture of metal soaps, antioxidants and acid scavengers and the ESTABEX 2307 brand product (also from Akcros) was a epoxy stabilizer. The phosphate esters used in this evaluation were: PHOSFLEX 390 brand (P-390) from Akzo Nobel Functional Chemicals LLC, an alkyl diphenyl phosphate commonly used in wire and cable applications as a flame retardant/plasticizer; and "NGPDP", which represents neopenytl glycol bis(diphenyl phosphate). Also included in this screening experiment were certain common flame retardant synergists and smoke suppressants, namely, zinc borate (from J. Storey) and ammonium octamolybdate (AOM LS030 brand).

The above formulations were compounded on a two-roll mill for a sufficient time to achieve homogeneity. The milled sheets were compression molded to specimen size to perform cone calorimeter analysis. The results are as follows:

Cone Calorimeter Study of Phosphate Esters in Vinyl

| | Composite No.: | | | |
|---|---|---|---|---|
| | 1 | 2 | 3 | 4 |
| Plasticizer | P-390 | NPGDP | NPGDP | NPGDP |
| Zinc borate | — | — | 6 | 6 |
| AOM | — | — | — | 6 |
| Cone Data* | | | | |
| Peak Heat Release Rate (PHRR) | 261.36 | 205.86 | 165.21 | 158.32 |
| Avg. Specific Extinction Area | 1126.33 | 1135.85 | 1037.72 | 1039.69 |
| Time To Ignition (TTI) | 16.97 | 22.31 | 26.16 | 22.17 |
| Fire Performance Index | 0.065 | 0.108 | 0.158 | 0.140 |
| Smoke Parameter | 294 | 234 | 171 | 165 |
| CO | 0.133 | 0.160 | 0.125 | 0.111 |
| $CO_2$ | 1.328 | 1.280 | 1.372 | 1.413 |

*Cone Calorimeter: 50 kW/$m^2$ heat flux

Discussion of Composite Testing Results:

Compared with the control flame retardant plasticizer, PHOSFLEX 390 brand (Ccomposite No. 1), the cone flammability data suggests that NPGDP (No. 2), at equivalent levels, performs as well or better in low smoke generation (see the lower specific extinction area—"SEA") and has a significantly less peak heat release rate than isodecyl diphenyl phosphate. Both the heat release rate and smoke generation of neopentyl glycol bis(diphenyl phosphate)/vinyl composites were further improved with the addition of zinc borate (see Composite Nos. 3 and 4). Converting this information into calculated values such as the "fire performance index" (the time to ignition divided by the peak heat release rate—a higher value implies greater fire performance) demonstrated significantly better performance than the use of neat P-390.

an alkylated diphenyl phosphate, from Ferro) and certain non-FR plasticizer types (DINP, diisononyl phthalate, from Exxon and TOTM, trioctyl trimellitate, from Sunoco), although in some cases demonstrating low smoke values, do not match the low smoke performance seen with combinations of the inorganics with the alkylene-bridged bisphosphate NPGDP (see the second Table set forth below).

|  | Formulation Nos.: | | | | | |
| --- | --- | --- | --- | --- | --- | --- |
|  | 5 | 6 | 7 | 8 | 9 | 10 |
| PVC (k value = 71) | 100 | 100 | 100 | 100 | 100 | 100 |
| CaCO3 | 10 | 10 | 10 | 10 | 10 | 10 |
| Alumina Trihydrate (Hydral 710) | 30 | 30 | 30 | 30 | 30 | 30 |
| Zinc Borate |  | 6 | 6 | 6 | 6 | 6 |
| AOM |  | 6 | 6 | 6 | 6 | 6 |
| NPGDP | 50 | 50 |  |  |  |  |
| TOTM |  |  |  |  |  | 50 |
| SANTICIZER 2148 |  |  |  |  | 50 |  |
| DINP |  |  | 50 |  |  |  |
| PHOSFLEX 31L |  |  |  | 50 |  |  |
| Epoxidized Soybean Oil (ESO) | 5 | 5 | 5 | 5 | 5 | 5 |
| Dibasic Lead Phthalate (DYTHAL) | 5 | 5 | 5 | 5 | 5 | 5 |
| BZ-4975 | 2.5 | 2.5 | 2.5 | 2.5 | 2.5 | 2.5 |
| Totals: | 202.5 | 214.5 | 214.5 | 214.5 | 214.5 | 214.5 |

|  | Formulation Nos.: | | | | | |
| --- | --- | --- | --- | --- | --- | --- |
|  | 5 NPGDP | 6 NPGDP/FRs | 7 DINP | 8 31L | 9 S2148 | 10 TOTM |
| Flammability |  |  |  |  |  |  |
| LOI: 1.6 mm | 33 | 34 | 28 | 37.5 | 29 | 27.5 |
| UL-94 (1.6 mm) | V-0 | V-0 | FAIL | V-0 | V-0 | V-1 |
| (AFT) | 0 | 0 | >4" | 0.1 | 0.5 | 2.6 |
| Cone Calorimeter Results |  |  |  |  |  |  |
| TTI | 34.75 | 21.76 | 16.27 | 47.85 | 18.13 | 17.53 |
| PHRR | 172.63 | 130.23 | 253.92 | 151.52 | 261.89 | 229.83 |
| Specific Extinction Area(Smoke) | 806.17 | 582.15 | 791.75 | 958.24 | 809.44 | 715.02 |
| Fire Protection Index | 0.201 | 0.167 | 0.064 | 0.316 | 0.069 | 0.076 |
| Smoke Parameter | 139 | 76 | 201 | 145 | 212 | 164 |
| Average $CO_2$ | 0.8332 | 1.0563 | 0.9633 | 0.8459 | 1.0343 | 0.9891 |
| Average CO | 0.1113 | 0.0575 | 0.0710 | 0.1089 | 0.0795 | 0.0795 |

Another calculated reference, the "smoke parameter" is derived from calculations of the peak heat release rate times the specific extinction area (smoke obscuration) divided by 1000 (lower value implies improved low smoke efficiency). The addition of the smoke suppressant ammonium octamolybdate (No. 4), showed a slight improvement to low smoke generation but is not considered to have a significant influence on the fire or smoke performance of the composite.

Although the use of neopentylene bis (diphenyl phosphate) as the sole FR additive showed low smoke and high flame retardant efficacy in vinyl composites, such characteristics can be further boosted in the presence of certain additional flame retardant additives. For example, the addition of zinc borate and ammonium octamolybdate have shown an exceptional boost in flame resistance and low smoke generation when blended with the aforementioned alkylene bridged bisphosphate (see Formulation Nos. 5 and 6, which are in accordance with the present invention, in the first Table set forth below). At fifty parts per hundred (phr) of plasticizer in a flexible vinyl formulation, a significant reduction of smoke generation was seen (about a twenty-eight percent decrease).

Similarly formulated composites using another monophosphate ester (i.e., the SANTICIZER 2148 brand product, The foregoing Examples have been presented to illustrate certain embodiments of the present invention and, for that reason should not be construed in a limiting sense. The scope of protection desired is set forth in the claims that follow.

What is claimed is:

1. A vinyl chloride resin composition that comprises as the major plasticizer a neopentyl glycol bis(diphenyl phosphate) composition in an amount that is no less than about 25% by weight, based upon the vinyl chloride resin being present at 100%, by weight.

2. A composition as claimed in claim 1 wherein the neopentyl glycol bis(diphenyl phosphate) composition is present at from about 35% to about 125%, by weight.

3. A composition as claimed in claim 1 wherein the neopentyl glycol bis(diphenyl phosphate) composition is present at from about 40% to about 90%, by weight.

4. A composition as claimed in claim 1 wherein additional flame retardant and smoke suppressant synergists are present.

5. A composition as claimed in claim 4 wherein zinc borate is additionally present.

6. A composition as claimed in claim 4 wherein ammonium octamolybdate is additionally present.

7. A composition as claimed in claim 2 wherein additional flame retardant and smoke suppressant synergists are present.

8. A composition as claimed in claim 3 wherein additional flame retardant and smoke suppressant synergists are present.

9. A composition as claimed in claim 8 wherein zinc borate is additionally present.

10. A composition as claimed in claim 7 wherein zinc borate is additionally present.

11. A composition as claimed in claim 8 wherein ammonium octamolybdate is additionally present.

12. A composition as claimed in claim 7 wherein ammonium octamolybdate is additionally present.

13. The composition as claimed in claim 5, wherein animonium octamolybdate is additionally present.

* * * * *